(12) United States Patent
Studnitzer (10) Patent No.: US 8,626,639 B2
(45) Date of Patent: Jan. 7, 2014

(54) TRADE MATCHING PLATFORM WITH VARIABLE PRICING BASED ON CLEARING RELATIONSHIPS

(75) Inventor: Ari Studnitzer, Northbrook, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 0 days.

(21) Appl. No.: 13/312,535

(22) Filed: Dec. 6, 2011

(65) Prior Publication Data

US 2012/0197776 A1   Aug. 2, 2012

Related U.S. Application Data

(60) Provisional application No. 61/438,933, filed on Feb. 2, 2011.

(51) Int. Cl.
*G06Q 40/00* (2012.01)

(52) U.S. Cl.
USPC .......................................................... 705/37

(58) Field of Classification Search
USPC .......................................................... 705/37
See application file for complete search history.

(56) References Cited

U.S. PATENT DOCUMENTS

| | | |
|---|---|---|
| 5,375,055 A | 12/1994 | Togher et al. |
| 5,806,050 A | 9/1998 | Shinn et al. |
| 6,014,627 A | 1/2000 | Togher et al. |
| 6,985,883 B1 | 1/2006 | Togher et al. |
| 6,996,541 B2 | 2/2006 | Togher et al. |
| 7,003,488 B2 | 2/2006 | Dunne et al. |
| 7,039,610 B2 | 5/2006 | Morano et al. |
| 7,149,717 B1 | 12/2006 | Kan |
| 7,260,554 B2 | 8/2007 | Morano et al. |
| 7,584,140 B2 | 9/2009 | Brady et al. |
| 7,610,238 B2 | 10/2009 | Togher et al. |
| 7,685,051 B2 | 3/2010 | Cummings et al. |
| 8,165,952 B2 | 4/2012 | Burrell et al. |
| 8,204,823 B1 | 6/2012 | Morano et al. |
| 2006/0259411 A1 | 11/2006 | Burns |
| 2007/0118459 A1 | 5/2007 | Bauerschmidt et al. |
| 2009/0171832 A1 | 7/2009 | Busby |

OTHER PUBLICATIONS

Nasdaq Working Quietly to Curb Bank Control of Clearinghouses, Clea Benson, Robert Schmidt and Silla Brush, Dec. 20, 2010, http://www.bloomberg.com/news/print/2010-12-20/nasdaq-working-quietly-to-curb-bank-control, retrieved Jan. 25, 2011, 5 pages.

CME signs up Wall Street heavy hitters for swaps clearing, Chicago Business, Dec. 3, 2009, http://www.chicagobusiness.com/cgi-bin/printStory.pl?news_id=36328, retrieved Dec. 3, 2009, 1 page.

SEF101: Deconstructing the Swap Execution Facility, Kevin McPartland, Posted Jul. 26, 2010, Deriv Alert.og, http://www.derivalert.org/blog/bid/43966/SEF-101-Deconstructing-the-Swap-Execution Facility, retrieved Jan. 25, 2011, 5 pages.

(Continued)

*Primary Examiner* — Lindsay M. Maguire
(74) *Attorney, Agent, or Firm* — Banner & Witcoff, Ltd.

(57) ABSTRACT

The disclosure describes a regulated trading platform capable of communicating with a plurality of clearing houses. In particular, aspects of the disclosure relate to providing and/or calculating differentiated prices for the same or underlying financial product/instrument capable of being cleared at different clearing houses. The trading platform may allow anonymous counterparties in a multi-clearinghouse environment, and with full transparency and improved liquidity. The trading platform may also allow for non-anonymous counterparties in some situations.

18 Claims, 3 Drawing Sheets

(56) References Cited

OTHER PUBLICATIONS

Execution and Clearing Process for Derivatives, taken from MF 10-K filed Jun. 10, 2009, http://www.wikinvest.com/stock/MF_Global_Ltd._(MF)/Execution_Clearing_Process_Derivatives, retrieved Jan. 27, 2011, 6 pages.

Swap Clearinghouses and Markets, Skadden Commentary on the Dodd-Frank Act, Jul. 9, 2010, Jerrold E. Salzman, http://www.skadden.com/Index.cfm?contentID=51&itemID=2130, retrieved Jan. 25, 2011, 7 pages.

Update 1-ICE to register as swaps trading platform, CEO says, Aug. 4, 2010, http://www.reuters.com/assets/print?aid=CNN0425882520100804, retrieved Jan. 25, 2011, 1 page.

Clearing Broker, What Does Clearing Broker Mean? http://www.investopedia.com/terms/c/clearingbroker.asp, retrieved Jan. 27, 2011, 1 page.

Executing Broker, What Does Executing Broker Mean? http://www.investopedia.com/terms/e/executingbroker.asp, retrieved Jan. 27, 2011, 1 page.

The Nifty-Gritty of Executing a Trade by Investopedia Staff, http://www.investopedia.com/articles/03/012403.asp, retrieved Jan. 27, 2011, 3 pages.

Cleared OTC Credit Default Swaps Extending Security to OTC Markets Through Open Clearing PowerPoint presentation, CME Group, Oct. 2009, 22 pages.

SEC Proposes Rules for Security-Based Swap Execution Facilities, Feb. 1, 2011, http://www.sec.gov/news/press/2011/2011-35.htm, retrieved Feb. 3, 2011, 7 pages.

Swap Execution Facility: The New Term on Wall Street, Ben Protess, Dec. 17, 2010, Legal/Regulatory, 3 pages.

What is a Swap Execution Facility? Streetwise Professor, Jul. 1, 2010, http://streetwiseprofessor.com/?p=3964, retrieved Jan. 25, 2011, 7 pages.

The Role of a Swap Execution Facility (SEF), © 2011 Tradeweb Markets LLC, tradeweb.com/about/.../style=print, retrieved Jan. 20, 2011, 3 pages.

PCT International Search Report mailed Jun. 1, 2012, PCT/US 12/23659, 13 pages.

File History for U.S. Appl. No. 13/437,583, filed Apr. 2, 2012; Inventor: Ari Studnitzer.

File History for U.S. Appl. No. 13/564,234, filed Aug. 1, 2012; Inventor: Ari Studnizter.

File History for U.S. Appl. No. 13/834,891, filed Mar. 15, 2013; Inventors: Ari Studnitzer, James W. Farrell, Paul J. Callaway, Barry L. Galster, and Pearce Peck-Walden.

TRADE MATCHING PLATFORM WITH VARIABLE PRICING BASED ON CLEARING RELATIONSHIPS

This application claims priority from U.S. Provisional Patent Application Ser. No. 61/438,933, filed Feb. 2, 2011, which is herein incorporated by reference in its entirety.

BACKGROUND

In the financial industry, credit default swaps (CDSs), request for quotes (RFQs), spread orders, and implied orders are well known.

A credit default swap (CDS) is a swap contract in which the buyer of the CDS makes a series of payments to the seller and, in exchange, receives a payoff if a credit instrument (typically a bond or loan) goes into default (fails to pay). Less commonly, the credit event that triggers the payoff can be a company undergoing restructuring, bankruptcy, or even just having its credit rating downgraded. There are two competing theories usually advanced for the pricing of credit default swaps. The first, referred to as the 'probability model', takes the present value of a series of cash flows weighted by their probability of non-default. This method suggests that credit default swaps should trade at a considerably lower spread than corporate bonds. The second model, proposed by Darrell Duffie, but also by John Hull and White, uses a no-arbitrage approach. Various techniques for valuing credit default swaps and determining their settlement price are known in the industry.

In addition, traders (and others) may submit a request for quote (RFQ) to an exchange and/or a regulated trading platform. RFQs are similar to orders submitted to an exchange, however, RFQs differ from an order in that an RFQ is not binding and not actionable. RFQs are well known in the art and commonly used by traders, clearing houses, and/or exchanges to inquire as to the current market for a particular financial instrument. RFQs, however, are sometimes abused. For example, a trader may flood the market with RFQs in an attempt to ascertain other traders' positions on particular financial instruments without binding himself to an order. Those that respond to RFQs (e.g., market makers, other traders, etc.) may disregard the RFQs due to the enormous quantity of RFQs. Unfortunately, a non-abusive RFQ may be left unresponded to because of such behavior. Furthermore, in some scenarios, market makers, which although they are under a contractual obligation to respond to RFQs, may still be less than diligent in responding to RFQs, thus resulting in a negative perception of an exchange.

In addition, traders sometimes desire to trade multiple financial instruments in combination using what is often called a spread order. Each component of the combination is called a leg. Traders can define the combination (e.g., an exchange-defined combination) and submit orders for each leg or in some cases can submit a single order for multiple financial instruments to avoid leg risk. Such orders may be called a strategy order, a spread order, or a variety of other names. For example, a spread is an order for the price difference between two contracts with the objective of profiting from a change in the price relationship. The counterparty orders that are matched against the aforementioned combination orders may be individual, "outright" orders or may be part of other combination orders. In the case of spread orders, the matching system may imply the counter party order by using multiple orders to create the counter party order. Examples of spreads include crack, crush, straddle, strangle, butterfly, calendar, and pack spreads.

Implied orders can fill in gaps in the market and allow spread and outright traders to share liquidity in a product where there would otherwise have been little or no available bids and asks. Thus, the liquidity of a product may be enhanced by the use of implied orders. For example, by linking the spread and outright markets, implied spread trading increases market liquidity. Examples of implied spread trading include those disclosed in U.S. patent application Ser. No. 10/986,967, entitled "Implied Spread Trading System," which is incorporated herein by reference. Large exchanges typically have order books for numerous spread products and legs of the spread products. The identification and processing of potential implied spreads inside electronic trading systems consumes sometimes substantial processing resources. U.S. Pat. No. 7,584,140, entitled "Method and System for Providing Option Spread Indicative Quotes," which is incorporated by reference in its entirety herein, describes systems and methods for, among other things, minimizing communication bandwidth consumption among parties trading derivative products and other types of financial instruments.

Finally, the Commodity Futures Trading Commission ("Commission" or "CFTC") is proposing new rules, and guidance and acceptable practices to implement new statutory provisions enacted by Title VII of the Dodd-Frank Wall Street Reform and Consumer Protection Act. The proposed rules, guidance, and acceptable practices, which apply to the registration and operation of a new type of regulated entity named a swap execution facility (SEF), implement the new statutory framework that, among other things, adds a new Section 5h to the Commodity Exchange Act ("CEA") concerning the registration and operation of swap execution facilities, and new Section 2(h)(8) to the CEA concerning the listing, trading and execution of swaps on swap execution facilities.

BRIEF SUMMARY

The present disclosure overcomes limitations of the prior art by providing methods and systems that provide for, among other things, an enhanced financial instrument comprising at least a clearinghouse attribute or desired clearing outcome. In one example, a method is disclosed for receiving, from a computing device of a user, an order for an enhanced financial instrument which identifies first and second clearinghouses. The order may be matched and processed using a matching engine module and order processing module. The enhanced financial instrument may correspond to an over-the-counter financial (OTC) financial product available at a plurality of clearinghouses including at least the first and second clearinghouses. A computer processor may determine that orders of the user at the first clearinghouse are non-actionable, but that orders of the user at the second clearinghouse are actionable. The computer processor may submit the matched order to the second clearinghouse. In addition, in some examples, the aforementioned method may also include receiving, from an exchange, market data records (e.g., order data, etc.) that include a clearinghouse designation (e.g., a first clearinghouse, a second clearinghouse, etc.) The computer processor may generate information formatted for transmission and display at the user's computing device. Such information may, in some examples, comprise at least a part of the received market data records and be formatted to gray out those portions corresponding to the first clearinghouse, but render as selectable those portions corresponding to the second clearinghouse.

In another example, a computer processor may accesses a user data store or a user database to retrieve a user's settings.

The user's settings may comprise one, two, or more of: a first indication of one or more of a plurality of clearinghouses at which prices are non-actionable but viewable; a second indication of one or more of the plurality of clearinghouses at which the prices are actionable; and a third indication of one or more of the plurality of clearinghouses restricted from the user. In the foregoing example, the system may receive from the user's computing device a financial identifier corresponding to an enhanced financial instrument for an over-the-counter product available at a plurality of clearinghouses including at least the first clearinghouse, second clearinghouse, and third clearinghouse. The system may then send market data records (e.g., order data) of the financial identifier that include the first indication (e.g., the first clearinghouse) and the second indication (e.g., the second clearinghouse) to the user's computing device. The market data records, in some examples, may include at least an attribute configured to identify a clearinghouse, a price (e.g., order price) attribute, and a financial identifier attribute. The system may generate information formatted for transmission and display at the user's computing device. Such formatting may, in some examples, be based on the user's settings including at least one of: a first style of graying out those portions corresponding to the first clearinghouse, and a second style of rendering as selectable those portions corresponding to the second clearinghouse. In addition, in some examples, the transmitted information may be formatted to be compatible for display as part of a scrolling, text-based messaging interface. In other examples the formatted transmitted information may be displayed as part of a matrix of clearinghouses.

Furthermore, in some examples, the price attribute of the received market data records may store at least bid and ask prices of the financial identifier of the enhanced financial instrument. The bid and ask prices may be specific to the clearinghouse identified in the clearinghouse attribute. Moreover, in some examples, the bid and ask prices of particular clearinghouse may be multiple levels deep or market by order. In one example, the data records may be level 2 records showing order by order. While level 2 records may be for non-anonymous markets, the can also be provided for anonymous markets in some scenarios in accordance with various embodiments of the disclosure.

In yet another example, a computer system may register with an exchange to automatically receive up-to-date market data including a clearinghouse identifier (e.g., clearinghouses identified in the second indication, clearinghouses identified in the first indication) and a financial identifier. As a result, the exchange may transmit market data, which comprises at least a price attribute, a financial identifier attribute, and/or a clearinghouse attribute, to the computer system.

Of course, the methods and systems of the above-referenced embodiments may also include other additional elements, steps, computer-executable instructions or computer-readable data structures. In this regard, other embodiments are disclosed and claimed herein as well. For example, the computer system may comprise a computer processor and a tangible, non-transitory computer memory storing computer-executable instructions, which when executed by the processor, causes the computer system to perform one or more of the steps described herein. The details of these and other embodiments of the present disclosure are set forth in the accompanying drawings and the description below. Other features and advantages of the disclosure will be apparent from the description and drawings and from the claims.

BRIEF DESCRIPTION OF DRAWINGS

Embodiments of the disclosure may take physical form in certain parts and steps, embodiments of which will be described in detail in the following description and illustrated in the accompanying drawings that form a part hereof, wherein.

DETAILED DESCRIPTION

The disclosure describes a regulated trading platform capable of communicating with a plurality of clearing houses. In particular, aspects of the disclosure relate to providing and/or calculating differentiated prices for the same or underlying financial product/instrument capable of being cleared at different clearing houses. The trading platform may allow anonymous counterparties in a multi-clearinghouse environment, and with full transparency and improved liquidity. The trading platform may also allow for non-anonymous counterparties in some situations.

Methods, systems and apparatuses are disclosed for an environment including, in some embodiments, a regulated trading platform (e.g., a SEF), which interacts with one or more clearing houses and users (e.g., buy-side clients, dealers (e.g., swap dealers), etc.), using enhanced financial instruments and enhanced graphical user interfaces (GUIs) or message interfaces. In some embodiments, dealers (or other entities or users providing liquidity) may calculate different prices for an enhanced financial instrument that is listed at multiple clearing houses (e.g., 140A, 140B, 140C, etc.) In some examples, the price may be driven by clearing house relationships (e.g., cross-margining benefits, different margin requirements, cost/price of clearing, etc.) In addition, the price may depend on factors such as, but not limited to, one or more of size of the order and the identity (e.g., credit rating) of the user (e.g., buy-side client). The regulated trading platform (e.g., a SEF) in such an example may aggregate and list trades to be cleared at multiple clearing houses, and have different prices for otherwise identical trades dependent on which clearing house a user can clear (or may wish to clear for margin and other reasons). A graphical user interface (GUI) in such an example may include a single display screen or multiple screens that display a matrix of clearing houses (e.g., clearing counter-party) to prices (see FIG. 3). For example, a clearing matrix may be displayed listing different clearinghouses along the x-axis and different prices for the same financial instrument across the y-axis. Similarly, an automated trading system may, in some examples, maintain a memory map internally based on message interfaces to track prices as a function of clearing houses for a single financial product. A user may interact with the GUI (or alternatively, a scrolling text-based messaging interface such as a Bloomberg™ terminal) to select a desired price and/or clearing counter-party (CCP) to clear its financial instrument (e.g., over-the-counter (OTC) instrument, swaps trade, etc.)

A financial instrument traded/cleared in a system in accordance with the disclosure may include a standardized over-the-counter (OTC) agreement. The agreement may be standardized/harmonized through a set of specifications promulgated by an association (e.g., International Swaps & Derivatives Association) or entity (e.g., a clearinghouse, SEF, etc.) For example, the agreement (e.g., financial instrument)

may include one or more of commonplace attributes/terms such as, but not limited to: price, notional amount, maturity/term, triggering event (e.g., in the case of a CDS), identification of a party/parties (e.g., a protection buyer) to the agreement. In one example, the price attribute may take the form of an array data structure. In addition, the agreement may include an attribute (e.g., a "CCP attribute") to designate a desired clearing house or CCP. The CCP attribute of the financial instrument may be populated through selection by a user of a clearing house (or a CCP where a CCP is linked to a clearing house) on a GUI (or alternatively, on a messaging interface) at a workstation terminal (e.g., computing device 120). A CCP may clear for just one clearing house, or alternatively, may be a clearing party for multiple clearing houses.

In an alternate embodiment, the CCP attribute of a financial instrument (e.g., OTC agreement) might not designate (i.e., left empty) a clearing house, and as such the system may rely on a default setting previously provided by the user (e.g., default user settings) and/or other entity (e.g., default global system settings). In one example, a default global system setting may apply to the entire regulated trading platform and either override or concede to the corresponding user-specific setting, if it is populated with a value. The default setting may provide the capability to provide greater preference details such that certain types of financial instrument may be automatically routed through an exchange to particular clearing houses or systems (e.g., non-SEF system 212). For example, the settings may indicate that all IRS agreements be cleared/quoted using clearing house D (104D), while CDS agreements be cleared/quoted using clearing house C. The settings may indicate a list of unique identifiers corresponding to each of the clearinghouses. In another embodiment, the indication may be a pointer linked to a group of clearinghouses. For example, one illustrative group may be those clearinghouses whose operating policy may prohibit sending bid/ask prices to users unless the user has an authorized relationship existing with the clearinghouse. The third indication of at least one clearinghouse restricted from the user may include the aforementioned illustrative group. In yet another example, a user may indicate that an order for a quantity of 100 contracts may be filled through any of two clearing houses (e.g., clearing house 140 A and 140B), and a trading platform system 100 may fill the orders and clear 60 contracts with clearing house 140A and the other 40 contracts with clearing house 140B. This indication (e.g., rule) may be stored in a user data store (e.g., user database 102) or other computer memory. Such aforementioned features may allow a trading platform (e.g., computing system 100) to offer users (e.g., user devices 120) and dealers (e.g., dealer devices 130) with a greater level of control over what information they receive and how that information is processed by the downstream systems (e.g., system 100 and clearing houses 140). Nevertheless, in some embodiments, the ability to submit an order (e.g., OTC agreement, incoming order, any inbound instructions, etc.) or trade may be governed by a clearing relationship and a user's desire/ability to clear at a specific CCP relative to the available prices at a CCP.

In accordance with various aspects of the disclosure, market data records about an enhanced financial instrument, in addition to comprising a financial identifier (e.g., "IBM" credit default swap), may also include a flag or identifier that indicates what clearing house (or other entity—e.g., DCM, non-SEF, SEF system) the market data relates to. For example, a "CCP attribute," as described herein, may be included in the market data record to indicate this relationship. Alternatively, this "CCP attribute" may indicate (e.g., with a blank value) that the market data record (e.g., a price quote on a particular instrument) is valid across all clearing houses. Such an embodiment may increase liquidity.

In addition, the CCP attribute may enable linked orders wherein a user/dealer may be allowed to indicate that it wants ten contracts of a particular financial instrument (e.g., IBM CDS) and that it wants them cleared through only two clearing houses. In such an example, some of the ten contracts may be cleared through clearing house A, while others are cleared through clearing house B. Moreover, in some examples the enhanced financial instrument may include a designation of different prices depending on the designated clearinghouse. The designation of different prices may be recited in the price attribute of the enhanced financial instrument. Alternatively, the price attribute may indicate an average price desired over all of the orders filled for the enhanced financial instrument. One or more combinations of the features recited above may be implemented and are contemplated by the disclosure. The user/dealer may also specify a priority setting (e.g., as part of the user settings) with a SEF 100 to indicate the preference in which orders may be cleared/executed and with whom they may be cleared (e.g., which clearing firm). Such linked orders may be enabled without requiring the user/dealer to create/manage separate contracts (e.g., one for clearing house A and another for clearing house B) because a standardized agreement may be used with the aforementioned CCP attribute. In other examples, a user/dealer may leave the CCP attribute blank to indicate that clearing house/firm is not a criteria for completing the order/request. As such, a SEF 100 may submit the order/request for clearing without regards for clearing house preferences.

Figure 3:
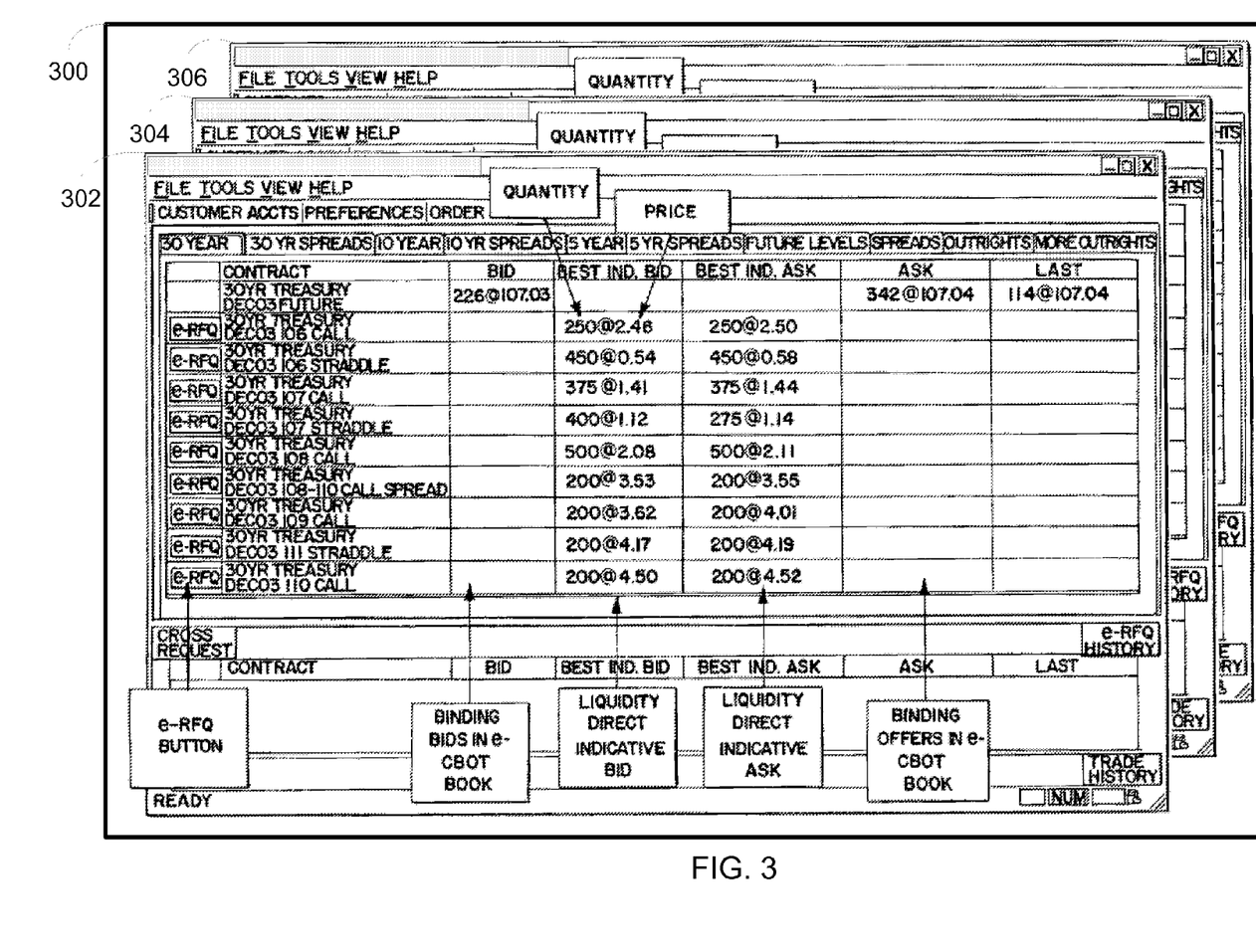
FIG. 3 shows an illustrative graphical user interfaces (GUIs) that may be generated and displayed in accordance with various aspects of the systems disclosed herein.

In accordance with the disclosure herein, a system is contemplated for generating and/or displaying a graphical user interface (GUI) comprising a matrix of price to clearing house (or other entities), as illustrated in FIG. 3. The system may comprise a processor, memory, and/or a display to execute computer-executable instructions recorded on the memory. The instructions may allow a user to select one or more financial instruments and to specify one or more clearing houses (or other entities—e.g., DCMs, etc.) The instructions may take this information and submit an enhanced RFQ, as described below, to a SEF 100, which sends a request to dealers for a quote with respect to particular clearing houses (or other entities). The SEF 100 may collect and organize the information received from the dealers into a graphical user interface for display to a user of user computing system 120. The GUI may, as described herein, include values that are non-actionable by a particular user for various reasons.

In some examples, a user (e.g., user of computing device 120) may request an enhanced request-for-quote (RFQ) directed to one or more clearing houses. As a result, the user may be provided with a messaging interface or a GUI displaying a clearing house matrix (e.g., differentiated pricing based on desired CCP). Appendix E of U.S. Provisional Patent Application Ser. No. 61/438,933 provides aspects of a RFQ that may be included in accordance with various aspects of this disclosure. In particular, FIGS. 1 and 2 of Appendix E of U.S. Provisional Patent Application Ser. No. 61/438,933 illustrate a regulated trading system (e.g., system 100) that receives RFQs from a user computing device 120 and process the RFQs through a RFQ processor module 142 (as illustrated in Appendix E of U.S. Provisional Patent Application Ser. No. 61/438,933). Paragraph 0028 of Appendix E of U.S. Provisional Patent Application Ser. No. 61/438,933 explains numerous terms that may be included as part of the RFQ. In accordance with various embodiments of the systems disclosed herein, a clearing house (or non-SEF system 212) attribute/term (e.g., a "CCP attribute") may be included in the RFQ (i.e., enhanced RFQ) to designate one or more desired clearing houses to inquire about. For example, the RFQ may designate only clearing house A (140A) and clearing house B (104B). As such, a computing system 100 receiving the RFQ may request market maker 130 to provide information only with respect to clearing at those particular clearing houses. One or more modules/components/system illustrated in FIGS. 1 and 2 of Appendix E of U.S. Provisional Patent Application Ser. No. 61/438,933 may be incorporated into the systems of FIGS. 1 and 2 of this disclosure to enable the features contemplated/disclosed herein.

In addition, in alternate embodiments, an enhanced RFQ might not designate a clearing house, and the clearing matrix generated for display to a user (e.g., a user of computing device 120) may display all clearinghouses (or a subset of the clearinghouses available for display to the user) by default. In yet another embodiment, a user might submit an enhanced RFQ that does not designate a clearing house (or submit a RFQ that may be backwards compatible with the illustrated system 100), and may instead rely on a default setting previously provided by the user and/or other entity (e.g., default global system settings). The default setting may provide the capability to provide greater preference details such that different clearing houses or systems (e.g., non-SEF system 212) may be designated for different types of financial instruments. These defaults may be used, in some examples, to support a market order that is sent for a financial instrument with a desire to obtain the best price following a default set of clearing houses up to a desired quantity. For example, the system settings may indicate that all IRS agreements be cleared/quoted using clearing house A, while CDS agreements be cleared/quoted using clearing house C. Such features may allow a trading platform (e.g., computing system 100) to provide benefits to it users/dealers as described above.

In some examples, the ability to submit an RFQ for a particular product may be governed by a clearing relationship and/or a user's desire/ability to clear at a specific CCP relative to the available prices at a CCP. Market makers or dealers (e.g., a dealer of system 130) may choose to quote or not quote specific CCPs or quote different spreads and liquidity based on its desire to clear at a specific CCP.

In addition, this disclosure contemplates a method involving enhanced RFQs (with a clearing house attribute) and one or more RFQ processor modules while omitting some or many of the modules/components described in Appendix E of U.S. Provisional Patent Application Ser. No. 61/438,933, such as the implied spread determination modules. In such a system, the submission of an enhanced RFQ may result in a clearing matrix (e.g., such as the price matrix illustrated in FIG. 3) being displayed on a GUI (or other messaging interface).

Referring to FIG. 3, the price matrix may provide the ability to view the different price quotes (e.g., bid and ask prices) for the same financial contract/agreement at multiple, different trading platforms (e.g., non-SEF system 212) or clearing houses (e.g., 104A, 104B, etc.) The received market data may be used to populate the price matrix. The data may be market by order (MBO) or market by price. For market by order, the data may be anonymous or non-anonymous. For market by price, the aggregated book may be multiple levels deep such that, in addition to the best bid and ask prices, the price attribute may store the next N best bid and ask prices, where N is a number greater than one (e.g., two, five, ten, etc.) In one example, the price attribute of the enhanced financial instrument may take the form of an array data structure. In some examples, multiple levels of data (e.g., bid/ask prices) may be available for those clearinghouses where the user's orders are actionable, but might or might not be available from other clearinghouses. The price corresponding to each clearing house/etc. may depend on one or more of the following factors including, but not limited to, the price to clear at a clearing house, cross-margining benefits, and other factors. Referring to the illustrative price matrix (e.g., clearing house matrix) of FIG. 3, the GUI 300 may include pricing information for various clearing houses (or other entities—e.g., designated contract markets (DCMs) and other non-SEFs 212). For example, in one example, the pricing information for clearing house A (140A) may be displayed on chart 302. Meanwhile, the pricing information for clearing house B (140B) may be displayed on chart 304, and the pricing information for clearing house C (140C) may be displayed on chart 306. In other examples, the pricing information for the multiple clearinghouses may be integrated into a single chart (or 2-dimensional or 3-dimensional graph) and compared side-by-side. A user of computing system 120 may view the GUI 300 on a visual display (e.g., LCD display) of computing system 120 and benefit from a side-by-side comparison of pricing as compared to each clearing house. In addition, in some examples, the generated information for display to the user may include a best bid price and best ask price across all of the clearinghouses, or alternatively, across all of the clearinghouses at which the user's orders are actionable (i.e., a first indication). As explained herein, one of ordinary skill in the art will appreciate after review of the entirety disclosed herein that not every clearing house's (or other entities) pricing may be displayed and/or actionable on GUI 300, per preferences and/or restrictions on the user's account/settings.

In one embodiment in accordance with aspects of the disclosure, implied orders may be generated/processed using some information from one or more RFQs. Referring to FIGS. 1 and 2 of Appendix E of U.S. Provisional Patent Application Ser. No. 61/438,933, a quote processor module and implied spread determination modules are illustrated that may be used in accordance with various aspects of the disclosure herein. For example, a RFQ may include an indication/request, in addition to requesting a quote of an OTC product (e.g., swap agreement), for a quote on a futures contract or other related product for a user (e.g., trader using computing device 120) to trade for, among other things, hedging purposes. In some embodiments an automatic hedging feature may be included to permit certain automatic safeguards.

In one embodiment in accordance with various aspects of the above examples, a method is contemplated comprising: receiving, using a RFQ processor module, a RFQ for a financial instrument, where the RFQ includes an attribute/term for indicating one or more clearing houses (e.g., a selected clearing house); sending, using the request for quote processor module, the financial instrument associated with the request for quote to implied spread determination modules at a plurality of clearing houses; determining, using the implied spread determination module, that the financial instrument associated with the request for quote in combination with one or more resting orders creates an implied spread, the implied spread comprising multiple legs, a first of the multiple legs corresponding to the financial instrument associated with the request for quote and a second leg of the multiple legs corresponding to a resting order of the one or more resting orders; and sending, using the implied spread determination module, a notification of the implied spread to the electronic match engine of a trading platform system (e.g., SEF) for matching, the matching including executing all the multiple legs of the implied spread. One or more features disclosed in Appendix E of U.S. Provisional Patent Application Ser. No. 61/438,933

(e.g., pages 28-32 of the Appendix) may be included in the aforementioned method involving RFQs.

In addition, the implied orders generated in the aforementioned examples may work across the same clearing house (e.g., clearing house A—104A) or across multiple clearing houses based on a clearing matrix as described herein. In addition, some implieds may be generated at or near front-end systems (e.g., user computing device 120) and may show implied strategies across clearing houses or exchanges where a user may clear or trade, respectively. For example, Appendix D of U.S. Provisional Patent Application Ser. No. 61/438, 933 describes a system in FIGS. 7 and 8 of the Appendix where trading engines at a front end interact with a matching system on the backend to monitor and regulate/manage risk and credit control. Such a system may limit, based on risk and credit controls, the ability of a user to clear at a particular clearing house. As a result, a price matrix displayed to such a user may or may not list blocked (e.g., undesirable or excluded/restricted by user/system settings, etc.) clearing houses and their corresponding pricing information. In alternate embodiments, a clearing matrix (e.g., GUI 300 in FIG. 3) may have the particular clearing house's prices grayed out (e.g., incapable of being selected; non-actionable) but still be displayed to the user. In some examples, GUI 300 may indicate that a price is non-actionable if the user wishing to act on the price cannot trade at the particular clearing house (e.g., does not have a relationship with that clearing house). The clearing matrix (e.g., GUI 300 in FIG. 3) may format information about a first clearinghouse (e.g., received bid and ask prices from the first clearinghouse) in a first style (e.g., color, font type, size, italics/bold/underline, not visible, etc.), but format information about a second clearinghouse in a second style.

In addition, the identification and processing of potential implied spreads inside electronic trading systems sometimes consumes substantial processing resources. Appendix F of U.S. Provisional Patent Application Ser. No. 61/438,933 describes systems and methods for, among other things, minimizing communication bandwidth consumption among parties trading derivative products and other types of financial instruments. The systems and methods of Appendix F of U.S. Provisional Patent Application Ser. No. 61/438,933 may be incorporated or used with the systems and methods disclosed herein. For example, market makers in the examples of Appendix F of U.S. Provisional Patent Application Ser. No. 61/438,933 may quote a financial instrument differently with respect to the clearing houses at which it will be cleared, and that quote data may be received at a SEF (e.g., a regulated trading platform 100) and used to facilitate derivation of indicative quotes for one or more financial products, as described in Appendix F of U.S. Provisional Patent Application Ser. No. 61/438,933. Moreover, one skilled in the art will appreciate after review of the entirety disclosed herein (including Appendix F of U.S. Provisional Patent Application Ser. No. 61/438,933) that the other examples and features disclosed in Appendix F of U.S. Provisional Patent Application Ser. No. 61/438,933 are contemplated by this disclosure for use with the examples described herein.

Figure 2:
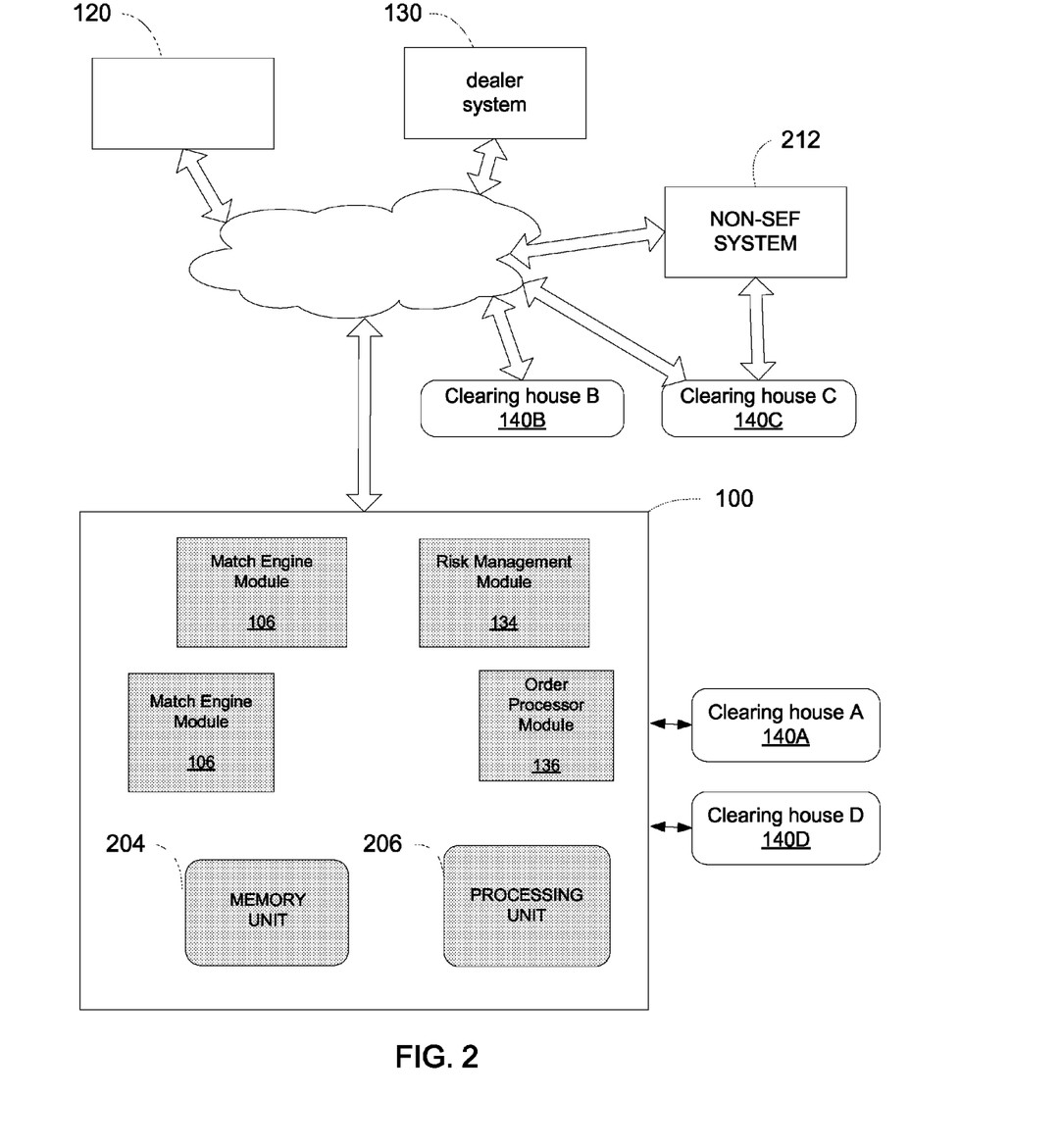
FIG. 2 illustrates a portion of an illustrative computer network system that may be used to implement various aspects of the systems disclosed herein.

Referring to FIG. 2, SEF systems (e.g., computing system 100) may be in communication with a designated contract market (DCM, such as non-SEF systems 212) and/or clearing house (e.g., 140B, 140C, 140A, etc.) In some examples, a SEF system may communicate through a non-SEF system 212 in order to clear at a particular clearing house 140C. In other instances a clearing house 140B may be available to all trading platforms. In another embodiment, clearing house A (140A) may only be available through a particular trading platform (e.g., SEF 100). Implied orders, RFQs, and other requests/submissions may be made across non-SEF 212 and SEF 100 systems. In some examples, a single computing system 100 (e.g., match engine module 106) may include both SEF service and non-SEF services.

Regarding an automatic hedging feature in accordance with various aspects of the disclosure, some OTC products (e.g., swaps, IRS, CDS, currency swaps, etc.) may be hedged with a product in a futures market or other market. In many instances, a futures product may have greater liquidity than an OTC product. As such, a user (e.g., user of computing system 120) may desire to hedge his/her OTC market risk with purchases on a futures market. In one example, the hedge may be specified to trade at a different or selection of clearinghouses. In another example, a user may submit a trade for an IRS (fixed or floating) with a hedge in a basket of Eurodollars. The user may submit a RFQ (or other order type, e.g., a covered call) that assist in deciding whether to automatically hedge the IRS trade. In the RFQ, the user may indicate non-swap (e.g., forward rate agreements) and cause the system 100 to generate implieds and quote those. When products are not listed on a SEF 100, the SEF may look to other platforms or clearing houses or DCMs (e.g., non-SEF systems 212). The SEF and non-SEF systems may interact to obtain the desired information. In some instances, a user may prefer to hedge at different clearing houses for risk management reasons; thus, the user may define a user-defined spread to obtain a desired set of contracts in a spread with each contract able to be at the same or different clearing houses. For example, a trading platform system 100 may fill a spread order and split the order such that sixty contracts are cleared with clearing house 140A and another forty contracts with clearing house 140B.

In another embodiment in accordance with various aspects of this disclosure, a regulated trading platform (e.g., system 100) may interact with numerous clearing houses (e.g., 140A, 140B, 140C, etc.) and other entities (e.g., non-SEF system 212, DCMs, etc.) The trading platform 100 may include a risk management module 134 as described herein. The risk management module 134 may compute and determine the amount of risk associated with a financial product or portfolio of financial products. Moreover, in some examples, risk management by the module may be done for a specific clearing house risk value or across a user-defined set of clearing houses (e.g., 140A-104C). In other examples, it may be done by user/trader, clearing firm, product, margin, etc. In yet another example, the risk may be aggregated as described in Appendix C of U.S. Provisional Patent Application Ser. No. 61/438,933. For example, FIGS. 7, 8, and 9 of Appendix C of U.S. Provisional Patent Application Ser. No. 61/438,933 illustrate a system where risk (e.g., corresponding margin requirements) may be calculated and adjusted based on calculations performed by the module 134. While those figures of Appendix C of U.S. Provisional Patent Application Ser. No. 61/438,933 reference a system interacting with numerous exchanges, it will be appreciated that the same type of interactions are applicable in this disclosure where a system 100 may interact with numerous clearing houses (e.g., 140) and/or other entities (e.g., non-SEF systems 212).

For example, applying the teachings of Appendix C of U.S. Provisional Patent Application Ser. No. 61/438,933, system 100 may send messages alerting users and/or other entities about risk thresholds and risk levels. For example, a SEF (e.g., trading system 100) may have access and exposure to multiple clearinghouses. As such, the SEF 100 may set a single credit limit across one or more of the clearing houses. The SEF 100 may set a limit on the amount of risk allowed at one clearing house (140A), but allow other clearing houses (140B) to allow greater risk. The SEF 100 may recognize that a user/trader holds a long position in a financial instrument at clearing house A (140A) and a short position in the same financial instrument at clearing house B (140B). As a result, the SEF 100 may uniquely assess the risk of the user's positions and may approve or reject the processing of the user's trades or requests.

In one example, a system for monitoring risk associated with orders placed at a trading platform is disclosed. The system may comprise: an interface to a plurality of clearing houses, one or more of these clearing house including a total credit parameter associated with a maximum aggregate risk parameter for the clearing house; and at least one credit control module communicable with the plurality of clearing houses, the credit control module receiving orders/trades and communicating a quantity definition to determine the value of orders placed on each individual clearing house; wherein if the value of orders exceeds a predetermined amount of the quantity definition, the credit control module requests an increase in credit from the order routing mechanism to another clearing house. In an alternate embodiment, the credit control module may route, based on user/system preferences, orders to be cleared to another clearing house with available credit.

As referenced in Appendix C of U.S. Provisional Patent Application Ser. No. 61/438,933, a credit control module may assist in implementing one or more of the aforementioned features. It will be appreciated that although some of the credit controls described in Appendix C of U.S. Provisional Patent Application Ser. No. 61/438,933 may be described with respect to exchanges or trading engines, the disclosure herein additionally contemplates credit control modules with respect to multiple clearing houses, users/traders, and other party (e.g., a clearing firms). In addition, a clearing house 140B in communication with multiple trading platform (e.g., SEF 100 and non-SEF system 212) may provide asynchronous credit controls (through a credit control module executing on its computing systems) across different SEFs and non-SEF systems.

Figure 1:
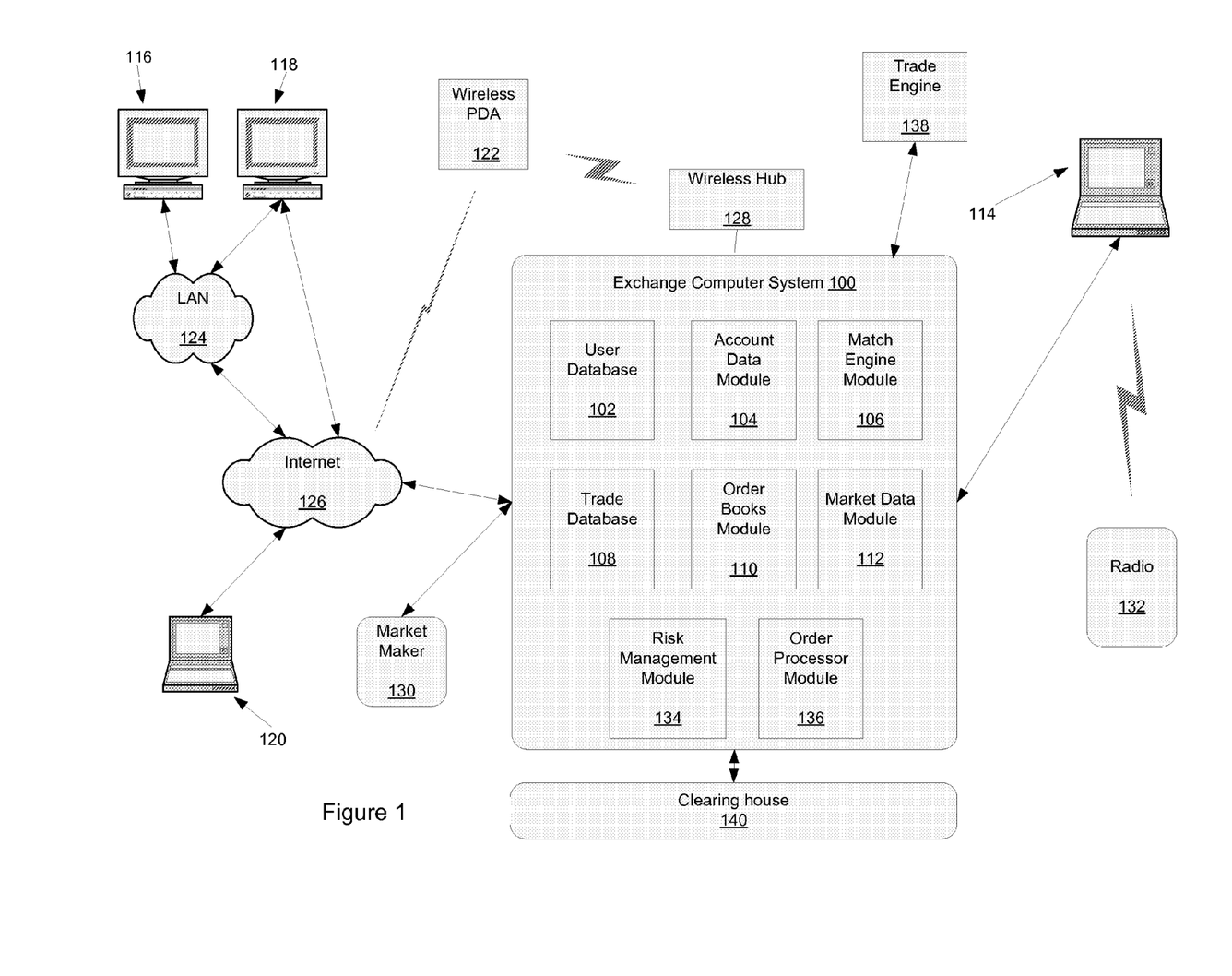
FIG. 1 depicts an illustrative computer network system that may be used to implement various aspects of the systems disclosed herein.

FIG. 1 depicts an illustrative operating environment that may be used to implement various aspects of the invention. The operating environment is only one example of a suitable operating environment and is not intended to suggest any limitation as to the scope of use or functionality of the invention. Aspects of the present invention are preferably implemented with computing devices and networks for exchanging, transmitting communicating, administering, managing and facilitating trading information including, but not limited to performance bond amount requirements and trading information. An exchange computer system 100 receives market data, analyzes historical data, calculates, and disseminates various values, e.g., accrued amounts associated with the declining balance methodology, historical accrual amounts, daily settlement price adjustments, cash payment etc., in accordance with aspects of the invention.

Exchange computer system 100 may be implemented with one or more mainframes, servers, gateways, controllers, desktops or other computers. The exchange computer system 100 may include one or more modules, processors, databases, mainframes, desktops, notebooks, tablet PCs, handhelds, personal digital assistants, smartphones, gateways, and/or other components, such as those illustrated in FIG. 1. Moreover, computer system 100 may include one or more processors (e.g., Intel® microprocessor, AMD® microprocessor, risk processor, etc.) and one or more memories (e.g., solid state, DRAM, SRAM, ROM, Flash, non-volatile memory, hard drive, registers, buffers, etc.) In addition, an electronic trading system 138, such as the Globex® trading system, may be associated with an exchange 100. In such an embodiment, the electronic trading system includes a combination of globally distributed computers, controllers, servers, networks, gateways, routers, databases, memory, and other electronic data processing and routing devices. The trading system may include a trading system interface having devices configured to route incoming messages to an appropriate devices associated with the trading system. The trading system interface may include computers, controllers, networks, gateways, routers and other electronic data processing and routing devices. Incoming messages may be received directly or indirectly (e.g., over the Internet, over a wired or wireless network, etc.) from a computing device 120 of a user and sent to a trading platform system 100. Orders that are placed with or submitted to the trading system are received at the trading system interface. The trading system interface routes the order to an appropriate device. A trading engine computer system 100 receives orders and transmits market data related to orders and trades to users.

A user data store (e.g., user database 102) may include information identifying traders and other users of exchange computer system 100. Such information may include user names and passwords. A trader operating an electronic device (e.g., computer devices 114, 116, 118, 120 and 122) interacting with the exchange 100 may be authenticated against user names and passwords stored in the user database 112. Furthermore, an account data module 104 may process account information that may be used during trades. The account information may be specific to the particular trader (or user) of an electronic device interacting with the exchange 100.

A match engine module 106 may match bid and offer prices for orders configured in accordance with aspects of the invention. Match engine module 106 may be implemented with software that executes one or more algorithms for matching bids and offers for financial instruments in accordance with aspects of the invention. The match engine module 106 and trading system interface may be separate and distinct modules or component or may be unitary parts. Match engine module may be configured to match orders submitted to the trading system. The match engine module may match orders according to currently known or later developed trade matching practices and processes. In an embodiment, bids and orders are matched on price, on a FIFO basis. The matching algorithm also may match orders on a pro-rata basis or combination of FIFO and pro rata basis. Other processes and/or matching processes may also be employed.

Moreover, a trade database 108 may be included to store historical information identifying trades and descriptions of trades. In particular, a trade database may store information identifying or associated with the time that an order was executed and the contract price. The trade database 108 may also comprise a storage device configured to store at least part of the orders submitted by electronic devices operated by traders (and/or other users). A confirmation message may be sent when the match engine module 106 finds a match for an order and the order is subsequently executed. The confirmation message may, in some embodiments, be an e-mail message to a trader, an electronic notification in one of various formats, or any other form of generating a notification of an order execution.

Furthermore, an order book module 110 may be included to compute or otherwise determine current bid and offer prices. The order book module 110 may be configured to calculate the price of a financial instrument. A risk management module 134 may be included in computer system 100 to compute and determine the amount of risk associated with a financial product or portfolio of financial products. An order processor module 136 may be included to receive data associated with an order for a financial instrument (e.g., an enhanced financial instrument). The module 136 may decompose delta based and bulk order types for processing by order book module 110 and match engine module 106. The order processor module 136 may be configured to process the data associated with the orders for financial instruments or additional attributes to handle post-trade routing. In some examples, the order processor module 136 may process the enhanced financial instrument by removing a clearinghouse attribute in the enhanced financial instrument before sending to a clearinghouse. At least one reason, among others, for removing the clearinghouse attribute in the enhanced financial instrument before sending to the clearinghouse may be for backwards compatibility reasons; the clearinghouse does not necessarily need to be aware of this attribute in order to perform its functions.

In addition, a market data module 112 may be included to collect market data and prepare the data for transmission to users. In one embodiment, the market data module 112 may publish the value of the current accrual amount, and/or the daily settlement price adjustment amount, and/or the cash payment amount. The market data module 112 may regularly disseminate updates to a financial instrument, including updates to the financial instrument that may occur as values (e.g., dividend announcements) are reported. The market data may be reported anonymously, clearing firm specific, and/or broker/trader specific in some examples. In some embodiments in accordance with aspects of the invention, the market data module 112 may update the market data records of a financial instrument on a daily basis (e.g., at the end of each trading day).

The trading network environment shown in FIG. 1 includes computer (i.e., electronic) devices 114, 116, 118, 120 and 122. The computer devices 114, 116, 118, 120 and 122 may include one or more processors, or controllers, that control the overall operation of the computer. The computer devices 114, 116, 118, 120 and 122 may include one or more system buses that connect the processor to one or more components, such as a network card or modem. The computer devices 114, 116, 118, 120 and 122 may also include interface units and drives for reading and writing data or files. Depending on the type of computer device, a user can interact with the computer with a keyboard, pointing device, microphone, pen device or other input device. For example the electronic device may be a personal computer, laptop or handheld computer, tablet pc and like computing devices having a user interface. The electronic device may be a dedicated function device such as personal communications device, a portable or desktop telephone, a personal digital assistant ("PDA"), remote control device, personal digital media system and similar electronic devices.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a local area network (LAN) 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

The operations of computer devices and systems shown in FIG. 1 may be controlled by computer-executable instructions stored on computer-readable storage medium. Embodiments also may take the form of electronic hardware, computer software, firmware, including object and/or source code, and/or combinations thereof. Embodiment may be stored on computer-readable media installed on, deployed by, resident on, invoked by and/or used by one or more data processors (e.g., risk processor), controllers, computers, clients, servers, gateways, networks of computers, and/or any combinations thereof. The computers, servers, gateways, may have one or more controllers configured to execute instructions embodied as computer software. For example, computer device 120 may include computer-executable instructions for receiving updated settlement prices, accrued amounts, and other information from computer system 100 and displaying to a user. In another example, computer device 118 may include computer-executable instructions for receiving market data from computer system 100 and displaying that information to a user. In yet another example, a processor of computer system 100 may be configured to execute computer-executable instructions that cause the system 100 to calculate a performance bond amount required to balance risk associated with a portfolio of financial instruments administered with a declining balance methodology.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems, such as clearing house 140. Coupling can be direct as described or any other method described herein.

A clearing house 140 enables an exchange computer system 100 to provide contracts with mutualized risk of counterparty credit risk than over-the-counter (OTC) products. A clearing house 140 arranges for transactions to be settled and cleared. Clearing is the procedure through which a clearing house 140 becomes buyer to each seller of a contract (e.g., futures contract, equities, currencies, interest rate products, etc.), and seller to each buyer, and assumes responsibility for protecting buyer and seller from financial loss by assuring performance on each contract. A clearing house 140 may settle trading accounts, clear trades, collect and maintain performance bond funds, regulate delivery and report trading data. In some scenarios an exchange may operate its own clearing house 140 through a division of the exchange through which all trades made are confirmed, matched, and settled each day until offset or delivered. In other words, the exchange computer system 100 may be internal to the clearing house 140. Alternatively, one or more other companies may be provided the responsibility of acting as a clearing house 140 with the exchange (and possibly other exchanges). An exchange may have one or more clearing houses associated with the exchange. An exchange may offer firms qualified to clear trades to provide a clearing house 140 for the exchange computer system 100. In some instances, these clearing members may be designated into different categories based on the type of commodities they can clear and other factors.

The clearing house 140 may establish minimum performance bond (i.e., margin) requirements for the products it handles. A customer may be required to deposit a performance bond with the clearing house 140 (or designated account) for the purpose of insuring the clearing house 140 against loss on open positions. The performance bond helps ensure the financial integrity of brokers, clearing houses, and exchanges as a whole. If a trader experiences a drop in funds below a minimum requirement, the clearing house 140 may issue a margin call requiring a deposit into the margin account to restore the trader's equity. A clearing house 140 may charge additional performance bond requirements at the clearing house's discretion. For example, if a clearing house's potential market exposure grows large relative to the financial resources available to support those exposures, the clearing house 140 may issue a margin call.

In another embodiment, the clearing house 140 may require a larger performance bond based on a credit check (e.g., an analysis of the credit worthiness, such as using a FICO™ or comparable score, inter alia) of the customer/trader. The credit check may be performed (i.e., initiated) by a clearing house 140 or an exchange 100. In the example where the clearing house 140 performs the credit check, the clearing house 140 may send a message (e.g., enforcement message) to the exchange 100. If the credit check indicates that a customer/trader is a high risk, the enforcement message may increase the margin requirements of the customer/trader, or otherwise adjust the capabilities/constraints of the customer/trader commensurate with the higher risk. In the example where the exchange 100 initiates the credit check, the exchange 100 may send a message to one or more clearing houses associated with the exchange 100 to update them on the increased/decreased risk associated with the customer/trader.

In recognition of the desire to promote efficient clearing procedures and to focus on the true intermarket risk exposure of clearing houses, a cross-margining system may be used. By combining the positions of joint and affiliated clearing houses in certain broad-based equity index futures and options into a single portfolio, a single performance bond requirement across all markets may be determined. The cross-margining system may greatly enhance the efficiency and financial integrity of the clearing system.

The principal means by which a clearing house 140 mitigates the likelihood of default is through mark-to-market (MTM) adjustments. The clearing house 140 derives its financial stability in large part by removing debt obligations among market participants as they occur. Through daily MTM adjustments, every contract is debited or credited based on that trading session's gains or losses. For example, as prices move for or against a position, funds flow into or out of the trading account. This cash flow is known as settlement variation.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

"Financial instruments" may include, but are not limited to, swap agreements, credit defaults swaps (CDS), interest rate swaps (IRS), forward rate agreements (FRAs), OTC equities, OTC foreign currency, derivative contracts, equities, currency swaps (FX), bilateral financial agreements, financial agreements involving a central clearing party/central counterparty (CCP), and other comparable financial instruments apparent to one of ordinary skill in the art after review of the entirety disclosed herein.

Of course, the methods and systems of the above-referenced embodiments may also include other additional elements, steps, computer-executable instructions, or computer-readable data structures. In this regard, other embodiments are disclosed and claimed herein as well. In other embodiments, the systems and methods may be partially or wholly implemented on a computer-readable medium, for example, by storing computer-executable instructions or modules, or by utilizing computer-readable data structures. These instructions may be executed by a processor of a computing device to perform one or more steps of the methods disclosed herein. The details of these and other embodiments are set forth in the accompanying drawings and the description herein. Other features and advantages of the disclosed method, systems, and apparatus will be apparent from the description, drawings, and appendices.

It will be apparent to those skilled in the art that a person understanding this invention may conceive of changes or other embodiments or variations, which utilize the principles disclosed herein without departing from the broader spirit and scope of the disclosure as set forth in the appended claims. For example, although numerous examples recite swap agreements, one skilled in the art will appreciate that the novel principles disclosed herein may be applied to other types of financial instruments and still fall within the scope of the invention contemplated herein.

I claim:
1. A computerized apparatus comprising:
   a computer processor configured to execute computer-executable instructions;
   a computer memory storing the computer-executable instructions, which when executed by the computer processor, cause the apparatus to:
      access a database to retrieve settings of a user, wherein the user's settings comprise:
         a first indication of one or more of a plurality of clearinghouses at which prices are non-actionable but viewable, wherein the first indication identifies at least a first clearinghouse,
         a second indication of one or more of the plurality of clearinghouses at which prices are actionable, wherein the second indication identifies at least a second clearinghouse, and
         a third indication of one or more of the plurality of clearinghouses restricted from the user, wherein the third indication identifies at least a third clearinghouse;
      register with an exchange computer system to automatically receive updated market data of a financial identifier, wherein the market data is associated with one or more clearinghouses identified in the second indication;

receive, from the exchange, market data comprising at least a price attribute and a financial identifier attribute;

generate, by the computer processor, information formatted for display to the user, wherein the information comprises at least a part of the received market data, and wherein the formatting is based on the user's settings; and transmit, by the computer processor, the formatted information for display to the user.

2. The apparatus of claim 1, wherein the price attribute of the received market data stores at least bid and ask prices of the financial identifier, wherein the bid and ask prices are specific to each of the clearinghouses, and wherein the bid and ask prices for the second clearinghouse are one of: multiple levels deep and market by order.

3. The apparatus of claim 1, wherein the generating the information further comprises:

formatting received bid and ask prices from at least the first clearinghouses identified in the first indication in a first style; and formatting received bid and ask prices from at least the second clearinghouses identified in the second indication in a second style.

4. The apparatus of claim 3, wherein the first and second styles include: graying out portions and rendering portions as selectable.

5. The apparatus of claim 1, wherein the computer memory stores further computer-executable instructions, which when executed by the computer processor, cause the apparatus to:

generate, by the computer processor, additional information comprising a best bid price and best ask price across all of the clearinghouses corresponding to the second indication.

6. The apparatus of claim 1, wherein the received market data comprising an attribute configured to identify a clearinghouse, and wherein a first market data and a second market data are nearly identical, but include different values for the price attribute based on the clearinghouse attribute.

7. The apparatus of claim 1, wherein the transmitted information is formatted to be compatible for display as part of a scrolling text-based messaging interface.

8. The apparatus of claim 1, wherein the transmitted information is formatted to be compatible for display as a matrix of clearinghouses to prices.

9. A method comprising:

access, by a computer processor, a database to retrieve settings of a user, wherein the user's settings comprise:

a first indication of one or more of a plurality of clearinghouses at which prices are non-actionable but viewable, wherein the first indication identifies at least a first clearinghouse, a second indication of one or more of the plurality of clearinghouses at which prices are actionable, wherein the second indication identifies at least a second clearinghouse, and a third indication of one or more of the plurality of clearinghouses restricted from the user, wherein the third indication identifies at least a third clearinghouse;

receive, from an exchange computer system, market data comprising at least a price attribute, a financial identifier attribute, and an attribute configured to identify a clearinghouse, wherein the market data is associated with one or more clearinghouses identified in the second indication;

generate, by the computer processor, information formatted for display to the user, wherein the information comprises at least a part of the received market data, and wherein the formatting is based on the user's settings; and transmit, by the computer processor, the formatted information for display to the user.

10. The method of claim 9, wherein the price attribute of the received market data stores at least bid and ask prices of the financial identifier, wherein the bid and ask prices are specific to each of the clearinghouses, wherein the bid and ask prices for the second clearinghouse are one of: multiple levels deep and market by order, and wherein a first market data and a second market data are nearly identical, but include different values for the price attribute based on the clearinghouse attribute.

11. The method of claim 9, wherein the generating the information further comprises:

formatting received bid and ask prices from at least the first clearinghouse identified in the first indication in a first style; and formatting received bid and ask prices from at least the second clearinghouse identified in the second indication in a second style.

12. The method of claim 11, wherein the first and second styles include: graying out portions and rendering portions as selectable.

13. The method of claim 11, wherein the transmitted information is formatted to be compatible for display as part of a scrolling text-based messaging interface.

14. The method of claim 9, wherein the transmitted information is formatted to be compatible for display as a matrix of clearinghouses to prices.

15. A non-transitory computer memory storing the computer-executable instructions that, when executed by a computer processor, cause a computer to:

access a database to retrieve settings of a user, wherein the user's settings comprise:

a first indication of one or more of a plurality of clearinghouses at which prices are non-actionable but viewable, wherein the first indication identifies at least a first clearinghouse, a second indication of one or more of the plurality of clearinghouses at which prices are actionable, wherein the second indication identifies at least a second clearinghouse, and a third indication of one or more of the plurality of clearinghouses restricted from the user, wherein the third indication identifies at least a third clearinghouse;

receive, from an exchange computer system, market data comprising at least a price attribute, a financial identifier attribute, and an attribute configured to identify a clearinghouse, wherein the market data is associated with one or more clearinghouses identified in the second indication;

generate information formatted for display to the user, wherein the information comprises at least a part of the received market data, and wherein the formatting is based on the user's settings; and transmit the formatted information for display to the user.

16. The non-transitory computer memory of claim 15, wherein a first market data and a second market data are nearly identical, but include different values for the price attribute based on the clearinghouse attribute.

17. The non-transitory computer memory of claim 15, wherein the transmitted information is formatted to be compatible for display as part of a scrolling text-based messaging interface.

18. The non-transitory computer memory of claim 15, wherein the transmitted information is formatted to be compatible for display as a matrix of clearinghouses to prices.

* * * * *